United States Patent [19]

Allen

[11] 4,237,983
[45] Dec. 9, 1980

[54] COMBINATION TILLER AND CULTIVATOR AND REVERSIBLE DRIVE ASSEMBLY THEREFOR

[76] Inventor: Douglas E. Allen, Garden Way Manufacturing Company, Inc., 102nd St. and Ninth Ave., Troy, N.Y. 12180

[21] Appl. No.: 967,412
[22] Filed: Dec. 7, 1978
[51] Int. Cl.³ .................... B62D 51/04; A01B 33/02
[52] U.S. Cl. ............................... 172/42; 74/355; 172/125; 180/19 R; 474/1
[58] Field of Search .................... 172/42, 43, 125; 180/19 R, 19 S, 19 H, 77 HT; 74/220, 355, 404, 551.3, 551.6, 551.7

[56] References Cited

U.S. PATENT DOCUMENTS

| | | | |
|---|---|---|---|
| 1,436,088 | 11/1922 | Geilear | 180/19 R |
| 3,812,736 | 5/1974 | Nickstadt | 74/355 X |

FOREIGN PATENT DOCUMENTS

| | | | |
|---|---|---|---|
| 837269 | 6/1960 | United Kingdom | 180/19 R |
| 903296 | 8/1962 | United Kingdom | 172/42 |

*Primary Examiner*—Richard T. Stouffer

[57] ABSTRACT

A drive assembly is disclosed which incorporates two power take-off assemblies between an input and output drive for an earthworking machine. The power take-off assemblies each have a clutch operable independently of the other clutch for drivingly connecting the input and output drives for rotating tines of the machine in opposite directions. A drive select mechanism is selectively movable between two different operating positions wherein the clutches of the power assemblies are respectively and alternatively actuated to establish the desired drive connection between the input and output drives.

9 Claims, 7 Drawing Figures

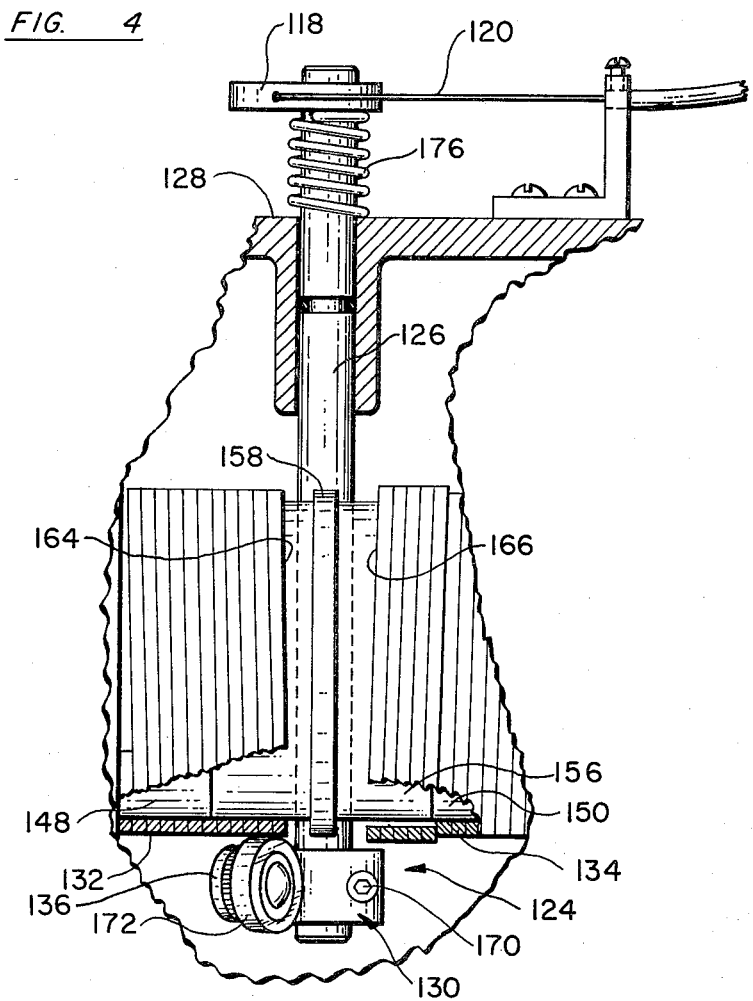
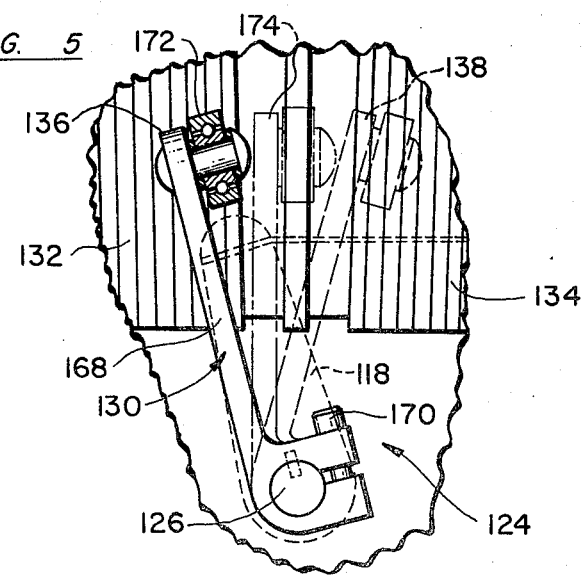

COMBINATION TILLER AND CULTIVATOR AND REVERSIBLE DRIVE ASSEMBLY THEREFOR

This invention generally relates to earthworking machines and particularly concerns a reversible drive assembly for rotating tines of such a machine in a predetermined angular direction.

A primary object of this invention is to provide a new and improved reversible drive assembly for use in an earthworking machine for drivingly connecting input and output drives of the machine through a selected one of a pair of power take-off assemblies of the transmission for respectively driving the output drive in opposite angular directions.

Another object of this invention is to provide such a drive assembly wherein each power take-off assembly includes a selectively operable clutch of simplified but rugged construction which is independently actuated for connecting and disconnecting a drive train to operate the tines of the machine in a predetermined angular direction.

A further object of this invention is to provide a drive assembly of the type described having simplified direct driving connection to wheels of the machine as the final stage of gear reduction from the transmission.

Yet another object of this invention is to provide a new and improved reversible drive assembly for an earth-working machine which utilizes a power operated unidirectional rotary input drive and which is particularly suited to deliver full engine power to the drive output in reverse as well as forward transmission modes.

A further object of this invention is to provide a drive assembly of the above described type which is economical to manufacture for reliable operation over an extended service life under demanding conditions and capable of promoting a desired operating flexibility to a combination tilling and cultivating machine incorporating the transmission.

Other objects will be in part obvious and in part pointed out more in detail hereinafter.

A better understanding of this invention will be obtained from the following detailed description and the accompanying drawings of an illustrative application of the invention.

In the drawings:

FIG. 4 is an enlarged view, partly broken away and partly in section, showing clutch components of two power take-off assemblies incorporated in the drive assembly of FIG. 3;

FIG. 5 is a schematic view, partly broken away and partly in section, showing an actuator for the clutch components of FIG. 4 and illustrating the actuator in different actuating positions;

Figure 1:
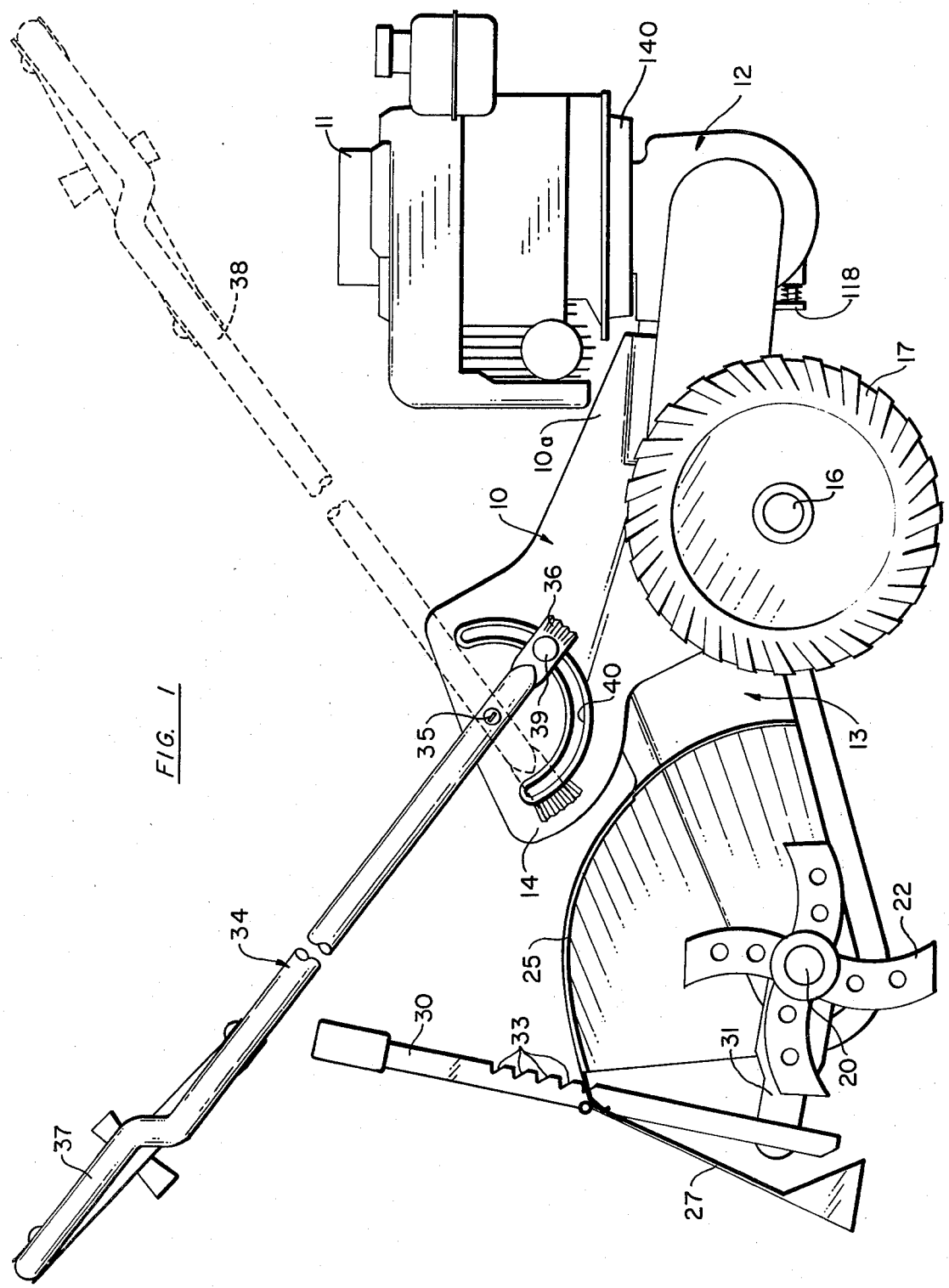
FIG. 1 is a side elevational view, partly broken away, showing a combination tilling and cultivating machine of a type wherein the drive assembly of this invention is particularly suitable to be used.

Referring now to the drawings in detail, FIG. 1 shows a self-powered, user guided combination earthworking machine capable of performing both rear end tilling and front end cultivating functions. The machine includes a main frame 10 which frame includes suitable mounting provisions at one end 10a for a gasoline engine 11 and a power transmission 12. A chain case 13 is welded to the other end of frame 10. Handle mounting members 14 are formed as integral extensions on each side of frame 10.

Frame 10 also supports in a conventional manner a drive axle 16 which supports wheels 17 and 18 in driving engagement therewith. Chain case 13 supports axle 20 in a conventional manner. Axle 20 has a plurality of pairs of earthworking implements or tines 22 fixed on opposite ends of the axle 20 for rotation with that axle. Frame 10 through its chain case 13 also supports a hood 25 which encloses tines 22. Hood 25 serves to support safety flap 27 which also encloses tines 22.

A depth of cut adjustment lever 30 is pivotally connected to arm 31 which in turn is journaled on shaft 20; through a suitable detent arrangement 33, the depth to which the tines 22 can penetrate the earth is easily controlled.

Attached to the spaced upwardly extending handle mounting members 14 is a generally U-shaped handle 34 pivotally supported on each handle mounting member 14 by fastener 35. To effect handle height adjustment, handle 34 and its end extension 36 may be constructed so as to be longitudinally adjustable relative to one another. End extension 36 is shown having a serrated end which cooperates with mating surface deformities on the handle mounting members 14 to permit the handle 34 to be fixedly secured by a suitable clamp 39 in each of two positions, the solid line position 37 and the dotted line position 38. Handle pivotal movement is accommodated by a generally semicircular slot 40 formed in mounting members 14 which cooperates with a bolt forming part of clamp 39.

The foregoing general orientation of parts corresponds to an earthworking machine as described and disclosed in copending United States Patent Application Ser. No. 967,415 filed Dec. 7, 1978 in the name of George W. Done entitled "Combination Cultivator and Tilling Apparatus" and assigned to the assignee of this application.

Engine 11 can be any conventional power source, gasoline, electric or the like, the output shaft 42 (FIGS. 2 and 3) of which is connected through power transmission 12 to output pulley 50. Belt 51 extends from pulley 50 to driven pulley 52 mounted on shaft 54. Shaft 54 is mounted for rotation in frame 10. Drive gear 56 is secured on shaft 54. In the described embodiment, wheel 18 is provided with a ring gear 60 around its inner rim which ring gear 60 is in direct driving engagement with wheel drive pinion 62 fixedly secured to wheel input shaft 64 suitably journaled in frame 10 in parallel spaced relation to shafts 16 and 54. Wheel input shaft 64 has fixed thereon driven gear 66 in continuous meshing engagement with drive gear 56. Sprocket 70 is also fixed to wheel input shaft 64 and cooperates with chain 72 to establish a driving connection to driven sprocket 74 supported on shaft 20.

Figure 2:
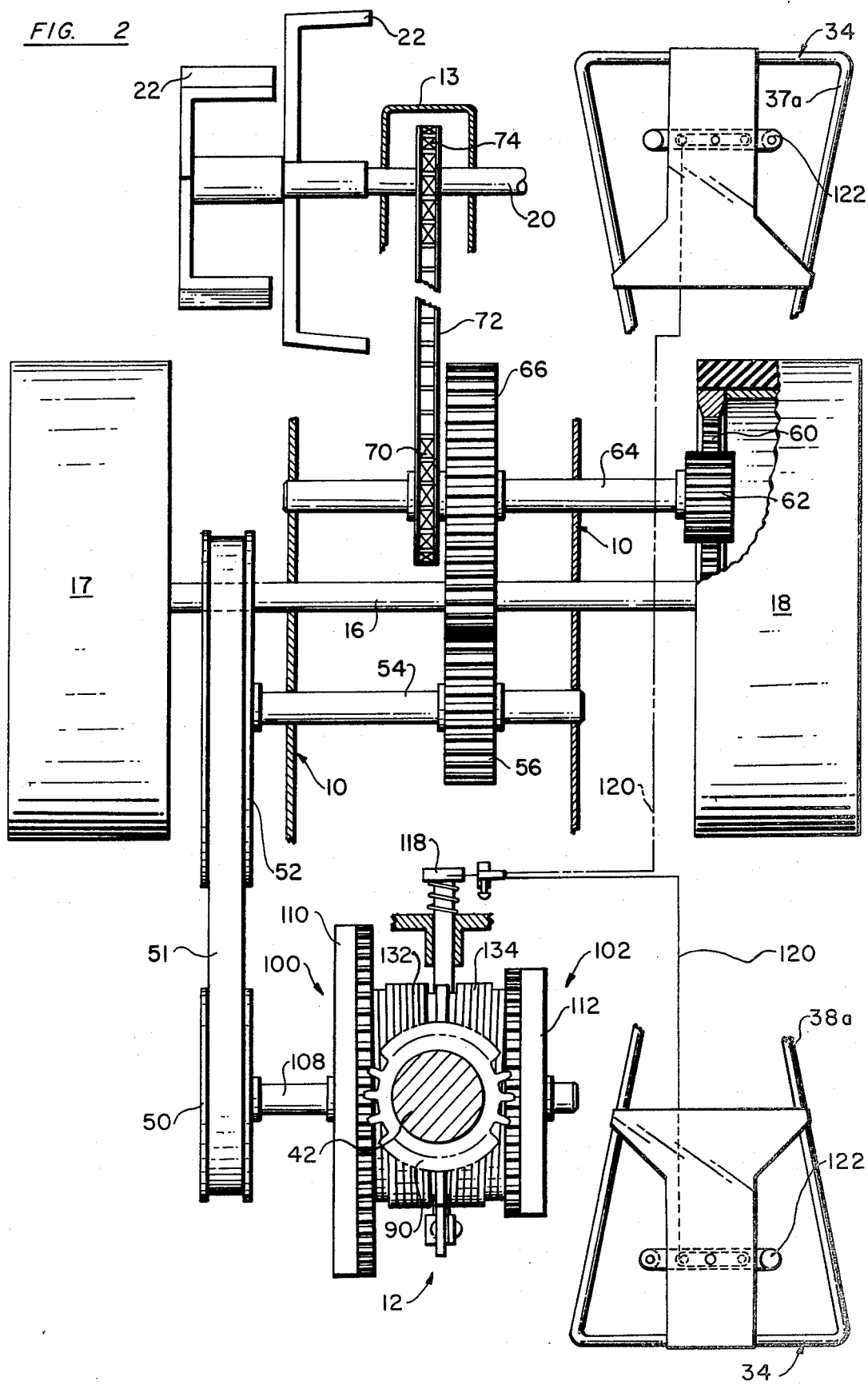
FIG. 2 is a schematic view, partly broken away and partly in section, showing a power drive train for delivering engine power to both the wheels and tines of the machine of FIG. 1.

The solid line position 37 of handle 34 in FIG. 1 and the handle position shown as 37a in the upper part of the power train schematic of FIG. 2 is the handle position for rear end tilling. For rear end tilling, the handle 34 is in overlying relation to tines 22, and wheels 17, 18 and tines 22 are normally rotatably driven in a clockwise direction as viewed in FIG. 1.

When it is desired to operate the machine in a front end mode for cultivating, it is merely necessary to release clamp 39 and rotate handle 34 to the dotted line position 38 in FIG. 1 (also shown in the lower part of the power train schematic of FIG. 2 at 38a) and to again re-engage clamp 39 so that handle 34 is locked in position. If desired, the depth adjustment lever 30 then can be raised and safety flap 27 can be raised to permit maximum front end exposure for the rotating tines 22. It is, however, necessary that the direction of rotation of the wheels 17, 18 and tines 22 be reversed to provide counterclockwise rotation thereof as viewed in FIG. 1.

To ensure delivery of full engine power to tines 22 in reversible modes while utilizing only a single input pinion 90 driven in one constant angular direction by motor output shaft 42 (which serves as the input drive to the transmission 12 from engine 11), the power transmission 12 includes first and second power take-off assemblies 100, 102 between the input drive 42 and output drive for respectively driving the tines 22 in opposite angular directions. Each assembly 100, 102 has a clutch 104, 106 which is selectively operable independently of the other clutch for drivingly connecting the input drive 42 to the output drive to the tines 22, the output drive including power transmission output shaft 108 and the above described drive train to the tines 22.

More specifically, when pinion 90 is operated by engine 11 to be constantly driven, say, in clockwise direction as viewed in FIG. 2, two face gears 110, 112, which are supported on bushings 114 and 116 for rotation about transmission output shaft 108, are respectively driven in opposite directions. A clutch control lever 118 may be manually rotated by retracting a bowden wire control 120 connected to operating lever 122 conveniently mounted on handle 34 to effect a desired counterclockwise drive to wheels 17, 18 and tines 22 for the front end cultivating mode. Clutch control lever 118 is a component of a drive select mechanism 124 (best seen in FIGS. 4 and 5) and is fixed to an exposed end of clutch control shaft 126 rotatably supported within gear box 128. A clutch arm assembly or clutch actuator 130 is keyed to an end of shaft 126 opposite lever 118 and engages a clutch spring 134 which drivingly connects face gear 112 to shaft 108 to effect the desired counterclockwise rotation of wheels 17, 18 and tines 22 with handle 34 in position 38a (FIG. 2) and bowden wire control 120 retracted. Should it be desired to rotate wheels 17, 18 and tines 22 in a clockwise direction (which would be in reverse when handle 34 is in its position 38a in the cultivating mode), the operating lever 122 is reversely shifted to advance the bowden wire control 120. This action rotates clutch control lever 118 and moves the clutch actuator 130 into its full line actuating position 136 in FIG. 5 from broken line actuating position 138 to engage clutch spring 132 of the other power take-off assembly 100, thereby disengaging clutch spring 134 and effecting clutching engagement between face gear 110 and the transmission output shaft 108 via clutch spring 132 to effect the desired clockwise rotation (as viewed in FIG. 1) of wheels 17, 18 and tines 22.

The clutch control lever 122 and its specific construction does not form any part of this invention but rather is the subject matter of copending United States Patent Application Ser. No. 967,411 filed Dec. 7, 1978 in the name of Donald W. Ackerman entitled "Drive Control for Combination Tiller and Cultivator" and assigned to the assignee of this invention.

More specifically, FIGS. 2–5 illustrate a first embodiment of the drive assembly of this invention. A subassembly assembly frame 140 for the transmission 12 is mounted below engine 11 and includes gear box 128 within which transmission 12 is mounted. As noted above, a single input spur type drive pinion 90 is secured at the end of motor drive shaft 42 which extends perpendicular to transmission output shaft 108 rotatably supported on bearings shown at 142 and 144 at opposite ends of gear box 128 which is secured by suitable fasteners such as 146 to subassembly frame 140. To provide different gear ratios through power take-off assemblies 100, 102, if desired, face gears 110, 112 may be of different diametrical size, and for illustrative purposes it will be understood that face gears 110 and 112 respectively are formed with 34 and 26 gear teeth in constant meshing engagement with pinion 90. In the illustrated embodiment of the transmission 12 shown in FIG. 3, bushings 114 and 116 rotatably support gear hubs 148 and 150 which are fixed by fasteners 152 and 154 to gears 110 and 112. A common output hub 156 is shown keyed to transmission output shaft 108 intermediate gear hubs 148, 150 and has an integrally formed, enlarged circular central boss 158.

Figure 3:
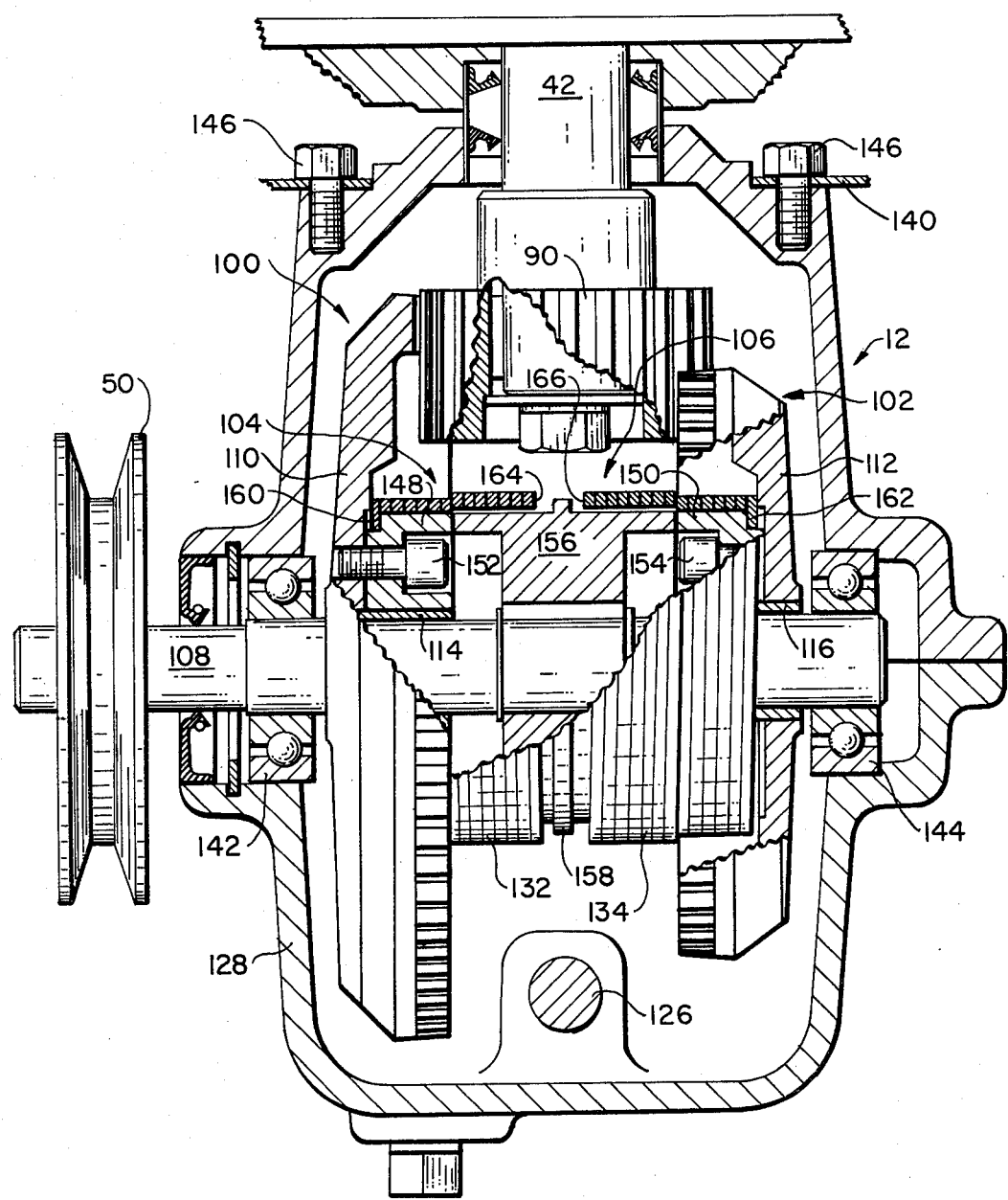
FIG. 3 is an enlarged view, partly broken away and partly in section, showing certain components of the drive assembly of this invention incorporated in the machine of FIG. 1.

The power transmission construction is specifically designed to insure that both face gears 110, 112 cannot engage the transmission output shaft 108 simultaneously. The clutch springs 132, 134 are shown in the form of spiral stepped springs having one end 160, 162 fixed between its respective gear hub 148, 150 and its gear 110, 112. Opposite free ends 164, 166 of springs 132, 134 extend beyond the respective gear hub 148, 150 and are disposed in overlying relation to output hub 156 and are spaced apart from output hub boss 158. As best seen in FIG. 3, the free ends 164, 166 and adjacent wraps of springs 132, 134 are of enlarged diameter relative to output hub 156 and are in normally disengaged relation thereto.

To establish drive connection between the input and output drives for rotating wheels 17, 18 and tines 22 of the machine in a predetermined angular direction and to insure that the spring clutches of the first and second power take-off assemblies 100, 102 are alternatively actuated, the drive select mechanism 124 is selectively movable between first and second operating positions best seen in FIG. 5 wherein its clutch control lever 118 will be understood to be rotatable from its illustrated broken line operating position to a second operating position, not shown, corresponding to the actuating position 138 of clutch actuator 130. Clutch actuator 130 includes an arm 168 secured by screw 170 to clutch control shaft 126 having a free end on which a roller 172 is supported for rotation.

Roller 172 is engageable with the first and second power take-off clutch springs 132, 134 alternatively for moving the free ends 164, 166 of each spring between its normally disengaged position and an engaged position for respectively disconnecting and connecting its respective gears 110, 112 to the output shaft 108. With operating lever 122 and bowden wire control 120 disposed as illustrated in FIG. 2, the angular position of the clutch arm 168 is such that its roller 172 engages output hub boss 158 to establish a neutral position 174 (FIG. 5) for the drive select mechanism 124 intermediate its first and second operating positions 136, 138. In neutral position, the clutches of the power take-off assemblies 100, 102 are both normally disengaged from the input drive. Upon moving the clutch control lever 118 in a selected direction, the clutch actuator 130 rotates and its roller 172 engages the free wrap 164 of clutch spring 132, e.g., which is caused to wind down onto output hub 156 and the spring 132 establishes a solid drive connection from gear 110 to hub 156 to transfer torque to transmission output shaft 108. Accordingly, pulley 50 mounted on shaft 108 rotates to drive the wheels 17, 18 and tines 22 in a clockwise direction. During such operation, pressure is applied by spring 176 to maintain roller 72 in engagement with the clutch spring 132, and clutch spring 134 is in its normally disengaged position (FIG. 4). To reverse the direction of rotation of the wheels 17, 18 and tines 22, the clutch control lever 118 is moved in an opposite direction via the control lever 122 to rotate the clutch control shaft 126 and its clutch actuator 130 whereby roller 172 moves out of engagement with clutch spring 132, over boss 158 and into engagement with clutch spring 134 of power take-off assembly 102. This action causes free wrap 166 of clutch spring 134 to wind down onto output hub 156, and spring 134 establishes the desired solid drive connection from face gear 112 to transmission output shaft 108.

An important feature of this invention provides for the rotation of wheel shaft 64 and its pinion 62 in the same angular direction as the tine axle 20 and the provision of the disclosed external wheel drive as the final stage of gear reduction for the power transmission 12. By virtue of the above described construction wherein pinion 62 is in continuous meshing engagement with the internal ring gear 60 of wheel 18, wheel 18 rotates in the same direction as tines 22 and effects a power drive for the machine through wheel shaft 64 to wheel 17 mounted thereon in coaxial relation to wheel 18. Such construction provides a significantly simplified but effective and rugged power drive for the machine utilizing a minimum number of different parts for dependable operation under demanding conditions.

Figure 6:
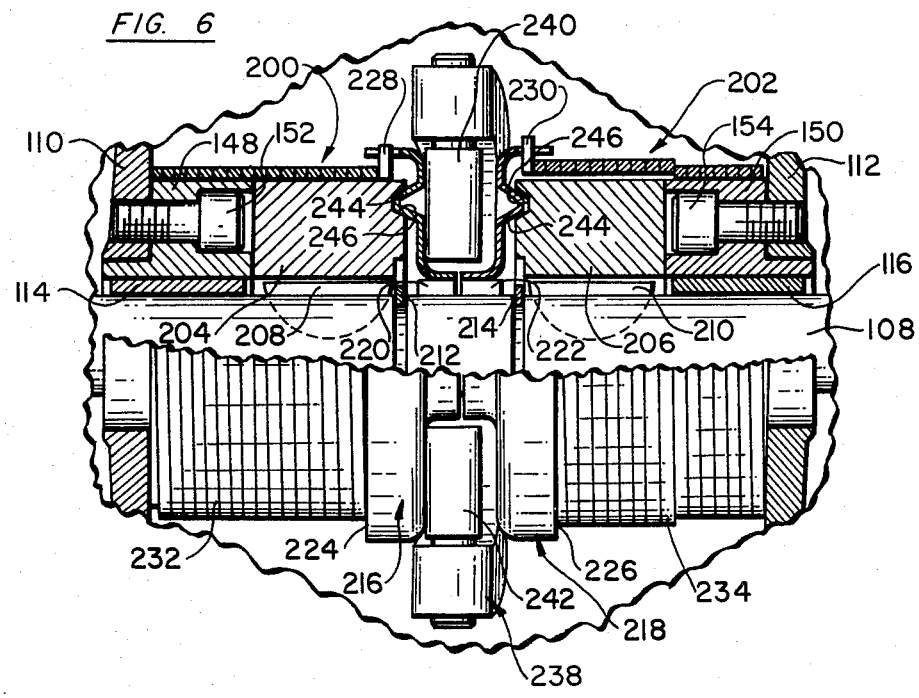
FIG. 6 is a section view, partly broken away, showing another embodiment of clutch components incorporated in the drive assembly of this invention.
Figure 7:
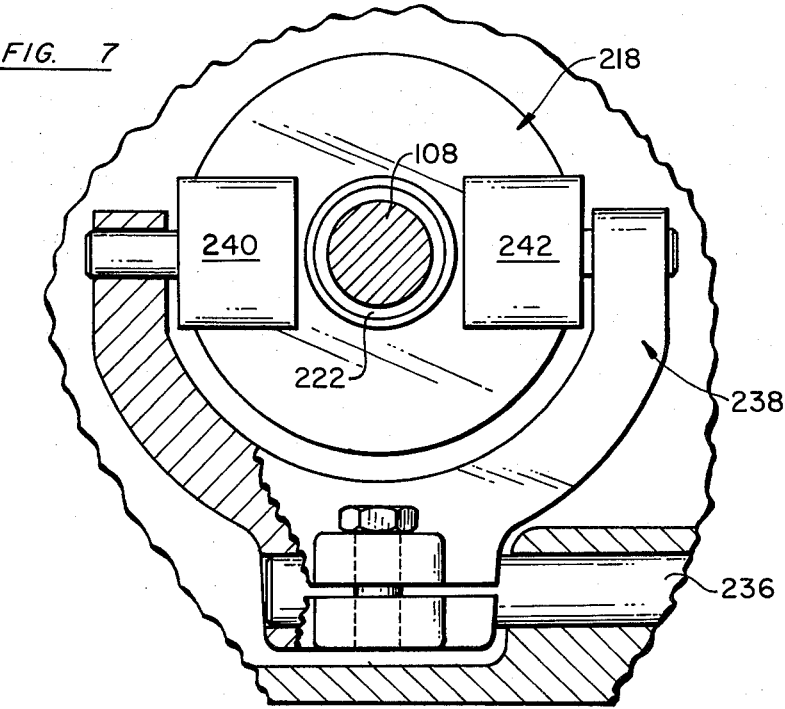
FIG. 7 is a view, partly broken away and partly in section, showing a clutch actuator for the drive assembly of FIG. 6.

A second embodiment of the power take-off assemblies of the transmission is illustrated in FIGS. 6 and 7. As in the previously described embodiment, face gears 110 and 112 are secured by fasteners 152 and 154 to gear hubs 148 and 150 which are bushed on transmission output shaft 108. The first and second power take-off assemblies are generally designated by the numerals 200 and 202. Each assembly 200 and 202 includes a hub 204 and 206 surrounding transmission output shaft 108 and secured thereto by keys 208 and 210. Retaining rings 212 and 214 are disposed in a groove in shaft 108 for retaining hubs 204, 206 against undesired axial movement. An axially movable disk 216, 218 is disposed adjacent each hub 204, 206, the disks being supported on bushings 220, 222 for rotation about the transmission output shaft axis. Each of the disks 216, 218 are shown as having outwardly flared rims 224, 226 which extend toward face gears 110, 112 respectively. Rims 224, 226 of disks 216, 218 each have an opening, not shown, for receiving a radially extending tang, 228, 230, defining a free end of clutch springs 232, 234.

By such construction, the disks 216, 218 will be driven in the same angular direction as their respective rotating face gears 110, 112. When it is desired, e.g., to engage the input and output drives through power take-off assembly 200 to drive wheels 17, 18 and tines 22 in a clockwise direction, the clutch control lever (such as at 118 in the first embodiment) is moved in one angular direction, causing clutch control shaft 236 (FIG. 7) to rotate in a corresponding direction whereupon a clutch actuator or yoke 238 secured to shaft 236 is caused to move actuating shoes 240 and 242, disposed between disks 216 and 218, into engagement with disk 216 and to axially displace that disk, from a normally disengaged relation to its confronting hub 204, into engagement with that hub in operating position. The tang 228 of spring 232 normally maintains disk 216 disengaged relative to hub 204. Upon being moved into engaged operating position, a circular projection 244 on the face of disk 216 moves into a groove 246 formed on a confronting face of hub 204. Such engagement with the normally stationary hub 204 effects a frictional drag on the rotating disk 216 causing the tang 228 of spring 232 to be wound down into clutching engagement with hub 204 as seen in FIG. 6, whereupon a solid drive connection is established between face gear 110 and hub 204 to rotate transmission output shaft 108 in the same angular direction as gear 110.

Upon moving control lever 118, e.g., in an opposite direction, the shoes 240, 242 of actuating yoke 238 move into neutral position intermediate the disk 216, 218 whereupon the tang 228 of spring 232 is permitted to relax and move into its normally disengaged position relative to hub 204 to disconnect the driving connection between face gear 110 and output shaft 108. Continued movement of yoke 238 toward disk 218 will effect the drive connection between face gear 112 and transmission output shaft 108 of power take-off assembly 202 as described above in connection with the first power take-off assembly 200.

By virtue of the above described construction, it will be seen that the drive assembly of this invention is of a simplified construction incorporating a minimum number of rugged operating parts which are relatively quick and easy to manufacture for dependable operation over an extended period of time with minimum service requirements.

As will be apparent to persons skilled in the art, various modifications, adaptations and variations of the foregoing specific disclosure can be made without departing from the teachings of this invention.

I claim:
1. In a combination tilling and cultivating machine having tines rotatably mounted on a frame supported on a pair of wheels and a rotary output drive supported on the frame for operating the tines responsive to operation of a power operated unidirectional rotary input drive, a reversible drive assembly mounted on the frame for drivingly connecting the input and output drives and comprising an invertible handle bar mounted on the frame and movable into opposite tilling and cultivating positions, a single transmission input gear drivingly connected to the input drive, a transmission output shaft mounted on the frame for rotation in opposite directions and drivingly connected to the output drive, first and second power take-off assemblies between the input and output drives, the power take-off assemblies each having a face gear supported for free rotation on the transmission output shaft in continuous meshing engagement with the transmission input gear for driving the face gears in opposite angular directions, the first and second power take-off assemblies each having a clutch selectively operable independently of the other clutch, each power take-off clutch being movable between a normally disengaged position and an engaged position drivingly connecting the face gear of its respective power take-off assembly and the transmission output shaft for driving the output drive in a predetermined angular direction opposite that of the other clutch in each handle bar position, and a manually operable drive select mechanism selectively movable between first and second operating positions in either handle bar position for alternatively actuating the clutches of the first and second power take-off assemblies to establish a predetermined drive connection between the input and output drives.

2. The assembly of claim 1 wherein the drive select mechanism has a neutral position intermediate its first and second operating positions, the clutches of both power take-off assemblies being disengaged with the drive select mechanism in neutral position whereby the output drive is disengaged.

3. The assembly of claim 1 wherein the face gears have a different number of teeth providing different gear ratios through the power take-off assemblies of the transmission.

4. The assembly of claim 1 wherein an axle is mounted on the frame, wherein the wheels are coaxially mounted on the axle for rotation therewith, wherein the output drive includes a drive shaft rotatably supported on the frame in offset parallel relation to the axle and having a pinion secured to the drive shaft, one of the wheels having an internal ring gear coaxially fixed thereon in direct driving meshing engagement with the pinion of the drive shaft to power operate the wheels in response to the drive connection between the input and output drives established by the drive select mechanism.

5. The assembly of claim 1 further including a drive control mounted on the handle bar and drivingly connected to the drive select mechanism for selectively moving it between said first and second operating positions in each handle bar position.

6. The assembly of claim 1 wherein the rotary output drive is drivingly connected to both the tines and to the wheels for operating the same responsive to the drive connection established between the input and output drives.

7. In a combination tilling and cultivating machine having tines rotatably mounted on a frame supported on a pair of wheels and a rotary output drive supported on the frame for operating the tines responsive to operation of a power operated unidirectional rotary input drive, a reversible drive assembly mounted on the frame for drivingly connecting the input and output drives and comprising an invertible handle bar mounted on the frame and movable into opposite tilling and cultivating positions, a transmission input gear connected to the input drive, a transmission output shaft mounted on the frame for rotation in opposite directions and drivingly connected to the output drive, first and second power take-off assemblies between the input and output drives for respectively driving the output drive in opposite angular directions in each handle bar position, the power take-off assemblies each having a face gear rotatably supported on the transmission output shaft in continuous meshing engagement with the transmission input gear for driving the face gears in opposite angular directions, the first and second power take-off assemblies each having a clutch selectively operable independently of the other clutch for drivingly connecting the input and output drives, each power take-off clutch being movable between an engaged position, wherein its face gear and the transmission output shaft are drivingly connected, and a normally disengaged position, each power take-off clutch including a spring coiled about the transmission output shaft, the spring having one end in fixed relation to its face gear and an opposite free end, the free end of the spring being in normally disengaged relation to the transmission output shaft and movable into an operative clutching position for establishing said drive connection, and a manually operable drive select mechanism selectively movable between first and second operating positions in either handle bar position, wherein the clutches of the first and second power take-off assemblies are alternatively actuated to establish a drive connection between the input and output drives for rotating the tines in a predetermined angular direction.

8. The assembly of claim 7 wherein the drive select mechanism has a clutch actuator movable into first and second actuating positions responsible to movement of the drive select mechanism into its first and second operating positions, the clutch actuator in its first and second actuating positions drivingly connecting the transmission output shaft and the free ends of the springs of the first and second power take-off assemblies, respectively.

9. The assembly of claim 7 wherein the clutch of each power take-off assembly includes a hub surrounding the transmission output shaft in fixed relation thereto, an axially movable disk disposed adjacent the hub, one of the confronting faces of the hub and disk having an annular groove therein in concentric relation to its axis and the other of the confronting faces of the hub and disk members having a projection formed therein extending in registering relation toward the groove, the disk being secured to the free end of the clutch spring and axially movable by the clutch actuator from an inoperative position to an operating position wherein the projection is received within the groove to effect a frictional drag between the hub and the disk to actuate the free end of the clutch spring into clutching engagement with the hub.

* * * * *